(12) United States Patent
Chang et al.

(10) Patent No.: US 12,088,003 B2
(45) Date of Patent: Sep. 10, 2024

(54) WEARABLE DEVICE

(71) Applicant: Quanta Computer Inc., Taoyuan (TW)

(72) Inventors: Kai-Hsiang Chang, Taoyuan (TW);
Chung-Ting Hung, Taoyuan (TW);
Chin-Lung Tsai, Taoyuan (TW);
Kuan-Hsien Lee, Taoyuan (TW);
Yu-Chen Zhao, Taoyuan (TW); Chun-I Cheng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 160 days.

(21) Appl. No.: 17/814,312

(22) Filed: Jul. 22, 2022

(65) Prior Publication Data

US 2023/0402741 A1      Dec. 14, 2023

(30) Foreign Application Priority Data

Jun. 14, 2022   (TW) .................................. 111121982

(51) Int. Cl.
*H01Q 1/27*        (2006.01)
*G02B 27/01*       (2006.01)
(Continued)

(52) U.S. Cl.
CPC ......... *H01Q 1/273* (2013.01); *G02B 27/0176* (2013.01); *H01Q 1/48* (2013.01); *H01Q 1/528* (2013.01); *G02B 2027/0178* (2013.01)

(58) Field of Classification Search
CPC .......... H01Q 1/273; H01Q 1/48; H01Q 1/528; G02B 27/0176; G02B 2027/0178; H05K 1/165; H05K 1/162
See application file for complete search history.

(56) References Cited

U.S. PATENT DOCUMENTS 1,715,701 A  *  6/1929   Fortescue ................ H01Q 1/14
                                                    370/278
3,170,399 A  *  2/1965   Hinman, Jr. ............ F42C 15/42
                                                    333/17.1
(Continued)

FOREIGN PATENT DOCUMENTS

CN         106464223 A    *  2/2017   .......... H03H 7/0115
CN         114497992 A    *  5/2022   .............. H01Q 1/36
WO    WO-2010013496 A1    *  2/2010   ............ H01P 1/2005

OTHER PUBLICATIONS

Chinese language office action dated May 5, 2023, issued in application No. TW 111121982.

*Primary Examiner* — Ricardo I Magallanes
*Assistant Examiner* — Jordan E. DeWitt
(74) *Attorney, Agent, or Firm* — McClure, Qualey & Rodack, LLP

(57) ABSTRACT

A wearable device includes a ground element, a first radiation element, a second radiation element, a third radiation element, a fourth radiation element, a fifth radiation element, and a sixth radiation element. The first radiation element has a feeding point. The first radiation element is coupled to the ground element. The third radiation element is coupled through the second radiation element to the first radiation element. The fourth radiation element is coupled through the second radiation element to the first radiation element. The fifth radiation element is coupled to the first radiation element. The sixth radiation element is coupled to the ground element. The sixth radiation element is adjacent to the fourth radiation element. An antenna structure is formed by the first radiation element, the second radiation element, the third radiation element, the fourth radiation element, the fifth radiation element, and the sixth radiation element.

9 Claims, 3 Drawing Sheets

(51) Int. Cl.
*H01Q 1/48* (2006.01)
*H01Q 1/52* (2006.01)

(56) References Cited

U.S. PATENT DOCUMENTS

| | | | | |
|---|---|---|---|---|
| 3,895,581 A * | 7/1975 | Jacob | F42C 13/04 | 342/68 |
| 3,902,173 A * | 8/1975 | Redcay | G01S 7/352 | 342/68 |
| 4,194,203 A * | 3/1980 | Kuck | F42C 13/04 | 342/16 |
| 4,195,295 A * | 3/1980 | Kuck | F42C 13/04 | 342/16 |
| 5,629,712 A * | 5/1997 | Adrian | H01Q 9/42 | 343/741 |
| 5,757,326 A * | 5/1998 | Koyama | H01Q 1/22 | 343/702 |
| 5,861,854 A * | 1/1999 | Kawahata | H01Q 1/243 | 343/702 |
| 6,531,988 B1 * | 3/2003 | Koyama | H01Q 13/08 | 343/702 |
| 9,024,829 B1 * | 5/2015 | Platt | H01Q 1/3291 | 343/711 |
| 9,905,912 B2 * | 2/2018 | Wu | H01Q 9/42 | |
| 10,454,156 B1 * | 10/2019 | Yang | H01Q 1/48 | |
| 10,490,881 B2 * | 11/2019 | Azad | H01Q 13/10 | |
| 10,522,902 B1 * | 12/2019 | Tseng | H01Q 1/48 | |
| 10,680,330 B2 * | 6/2020 | Su | H01Q 9/0407 | |
| 10,868,354 B1 * | 12/2020 | He | H01Q 1/243 | |
| 11,784,397 B1 * | 10/2023 | Lee | H01Q 5/385 | 343/718 |
| 2002/0097186 A1 * | 7/2002 | Fowler | H01Q 21/30 | 343/700 MS |
| 2006/0220957 A1 * | 10/2006 | Tanaka | H01Q 1/38 | 343/700 R |
| 2007/0146221 A1 * | 6/2007 | Oshiyama | H01Q 9/16 | 343/895 |
| 2007/0229369 A1 * | 10/2007 | Platz | H04R 25/554 | 343/866 |
| 2008/0316115 A1 * | 12/2008 | Hill | H01Q 21/30 | 343/702 |
| 2009/0309799 A1 * | 12/2009 | Hossain | H01Q 3/44 | 343/754 |
| 2010/0026585 A1 * | 2/2010 | Pan | H01Q 5/371 | 343/700 MS |
| 2010/0123641 A1 * | 5/2010 | Hung | H01Q 5/371 | 343/893 |
| 2010/0277390 A1 * | 11/2010 | Lee | H01Q 5/40 | 343/893 |
| 2010/0321273 A1 * | 12/2010 | Kuramoto | H01Q 9/285 | 343/860 |
| 2012/0001827 A1 * | 1/2012 | Chen | H01Q 9/0442 | 343/908 |
| 2012/0076184 A1 * | 3/2012 | Tran | H01Q 9/42 | 343/702 |
| 2012/0162017 A1 * | 6/2012 | Lee | H01Q 9/0421 | 343/700 MS |
| 2012/0162038 A1 * | 6/2012 | Lee | H01Q 9/0421 | 343/749 |
| 2012/0169555 A1 * | 7/2012 | Tsou | H01Q 5/364 | 343/749 |
| 2013/0187789 A1 * | 7/2013 | Lowe | A61B 5/6898 | 343/718 |
| 2013/0241795 A1 * | 9/2013 | Sung | H01Q 9/42 | 343/876 |
| 2013/0271341 A1 * | 10/2013 | Lin | H01Q 9/0421 | 343/860 |
| 2014/0055309 A1 * | 2/2014 | Jenwatanavet | H01Q 9/42 | 343/893 |
| 2014/0097995 A1 * | 4/2014 | McKinzie, III | H01Q 21/26 | 29/601 |
| 2014/0320357 A1 * | 10/2014 | Chang | H01Q 1/243 | 343/718 |
| 2015/0002355 A1 * | 1/2015 | Yan | H01Q 1/2283 | 343/893 |
| 2015/0022415 A1 * | 1/2015 | Lin | H01Q 1/243 | 343/841 |
| 2015/0070239 A1 * | 3/2015 | Hung | H01Q 1/48 | 343/848 |
| 2015/0155625 A1 * | 6/2015 | Park | H01Q 9/0407 | 342/368 |
| 2015/0200457 A1 * | 7/2015 | Chan | H01Q 5/357 | 343/700 MS |
| 2015/0318618 A1 * | 11/2015 | Chen | H01P 7/082 | 343/750 |
| 2015/0359428 A1 * | 12/2015 | Lowe, Jr. | A61B 5/6829 | 340/870.07 |
| 2016/0111790 A1 * | 4/2016 | Anguera Pros | H01Q 1/38 | 343/700 MS |
| 2016/0240918 A1 * | 8/2016 | Yoon | H04B 1/0458 | |
| 2017/0018838 A1 * | 1/2017 | Wu | H01Q 9/42 | |
| 2018/0048076 A1 * | 2/2018 | Wei | H01Q 21/30 | |
| 2018/0062243 A1 * | 3/2018 | Yang | H01Q 1/2291 | |
| 2018/0062245 A1 * | 3/2018 | Wu | H01Q 1/273 | |
| 2018/0090847 A1 * | 3/2018 | Romano | H01Q 9/0414 | |
| 2018/0152141 A1 * | 5/2018 | Koyama | H01L 31/02327 | |
| 2018/0183139 A1 * | 6/2018 | Liu | H01Q 1/243 | |
| 2018/0198192 A1 * | 7/2018 | Wu | H01Q 1/273 | |
| 2018/0269561 A1 * | 9/2018 | Kim | H01Q 1/48 | |
| 2018/0288203 A1 * | 10/2018 | Jeon | H01Q 5/30 | |
| 2018/0324960 A1 * | 11/2018 | Lee | H05K 3/4655 | |
| 2019/0103676 A1 * | 4/2019 | Sugimoto | H01Q 1/42 | |
| 2019/0115653 A1 * | 4/2019 | Yun | H01Q 21/28 | |
| 2019/0198983 A1 * | 6/2019 | Moore | G02B 27/017 | |
| 2019/0214727 A1 * | 7/2019 | Mikawa | H01Q 9/42 | |
| 2019/0319359 A1 * | 10/2019 | Hayata | H01Q 9/30 | |
| 2020/0006853 A1 * | 1/2020 | Park | H05K 1/024 | |
| 2020/0103833 A1 * | 4/2020 | Kita | G04R 60/10 | |
| 2021/0005952 A1 * | 1/2021 | Chang | H01Q 1/243 | |
| 2021/0036418 A1 * | 2/2021 | Lin | H01Q 5/328 | |
| 2021/0066801 A1 * | 3/2021 | Tsai | H01Q 9/42 | |
| 2021/0126355 A1 * | 4/2021 | Chuang | H01Q 1/243 | |
| 2021/0242571 A1 * | 8/2021 | Ha | H01Q 1/243 | |
| 2022/0094060 A1 * | 3/2022 | Chang | H01Q 5/385 | |
| 2022/0190465 A1 * | 6/2022 | Chang | H01Q 1/245 | |
| 2022/0336948 A1 * | 10/2022 | Chang | H01Q 9/42 | |
| 2023/0198149 A1 * | 6/2023 | Wei | H01Q 5/335 | 343/702 |
| 2023/0208040 A1 * | 6/2023 | Zhang | H01Q 9/42 | 343/702 |
| 2023/0402741 A1 * | 12/2023 | Chang | H01Q 5/371 | |
| 2024/0030615 A1 * | 1/2024 | Cheng | H01Q 5/378 | |

* cited by examiner

US 12,088,003 B2

WEARABLE DEVICE

CROSS REFERENCE TO RELATED APPLICATIONS

This application claims priority of Taiwan Patent Application No. 111121982 filed on Jun. 14, 2022, the entirety of which is incorporated by reference herein.

BACKGROUND OF THE INVENTION

Field of the Invention

The disclosure generally relates to a wearable device, and more particularly, to a wearable device and an antenna structure therein.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the related mobile device. Accordingly, it has become a critical challenge for antenna designers to design a small-size, wideband antenna structure.

BRIEF SUMMARY OF THE INVENTION

In an exemplary embodiment, the invention is directed to a wearable device that includes a ground element, a first radiation element, a second radiation element, a third radiation element, a fourth radiation element, a fifth radiation element, and a sixth radiation element. The first radiation element has a feeding point. The first radiation element is coupled to a first grounding point on the ground element. The third radiation element is coupled through the second radiation element to the first radiation element. The fourth radiation element is coupled through the second radiation element to the first radiation element. The fifth radiation element is coupled to the first radiation element. The sixth radiation element is coupled to a second grounding point on the ground element. The sixth radiation element is adjacent to the fourth radiation element. An antenna structure is formed by the first radiation element, the second radiation element, the third radiation element, the fourth radiation element, the fifth radiation element, and the sixth radiation element.

In some embodiments, the combination of the first radiation element, the second radiation element, and the third radiation element substantially has a U-shape.

In some embodiments, the combination of the second radiation element and the fourth radiation element substantially has an L-shape.

In some embodiments, the fourth radiation element includes a narrow portion and a wide portion, and the wide portion is coupled through the narrow portion to the second radiation element.

In some embodiments, the fifth radiation element substantially has a relatively narrow straight-line shape, and the sixth radiation element substantially has a relatively wide straight-line shape.

In some embodiments, a coupling gap is formed between the sixth radiation element and the fourth radiation element. The width of the coupling gap is shorter than or equal to 1 mm.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the first radiation element, the second radiation element, and the third radiation element is substantially equal to 0.25 wavelength of the first frequency band.

In some embodiments, the total length of the second radiation element and the fourth radiation element is substantially equal to 0.25 wavelength of the second frequency band.

In some embodiments, the length of the sixth radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
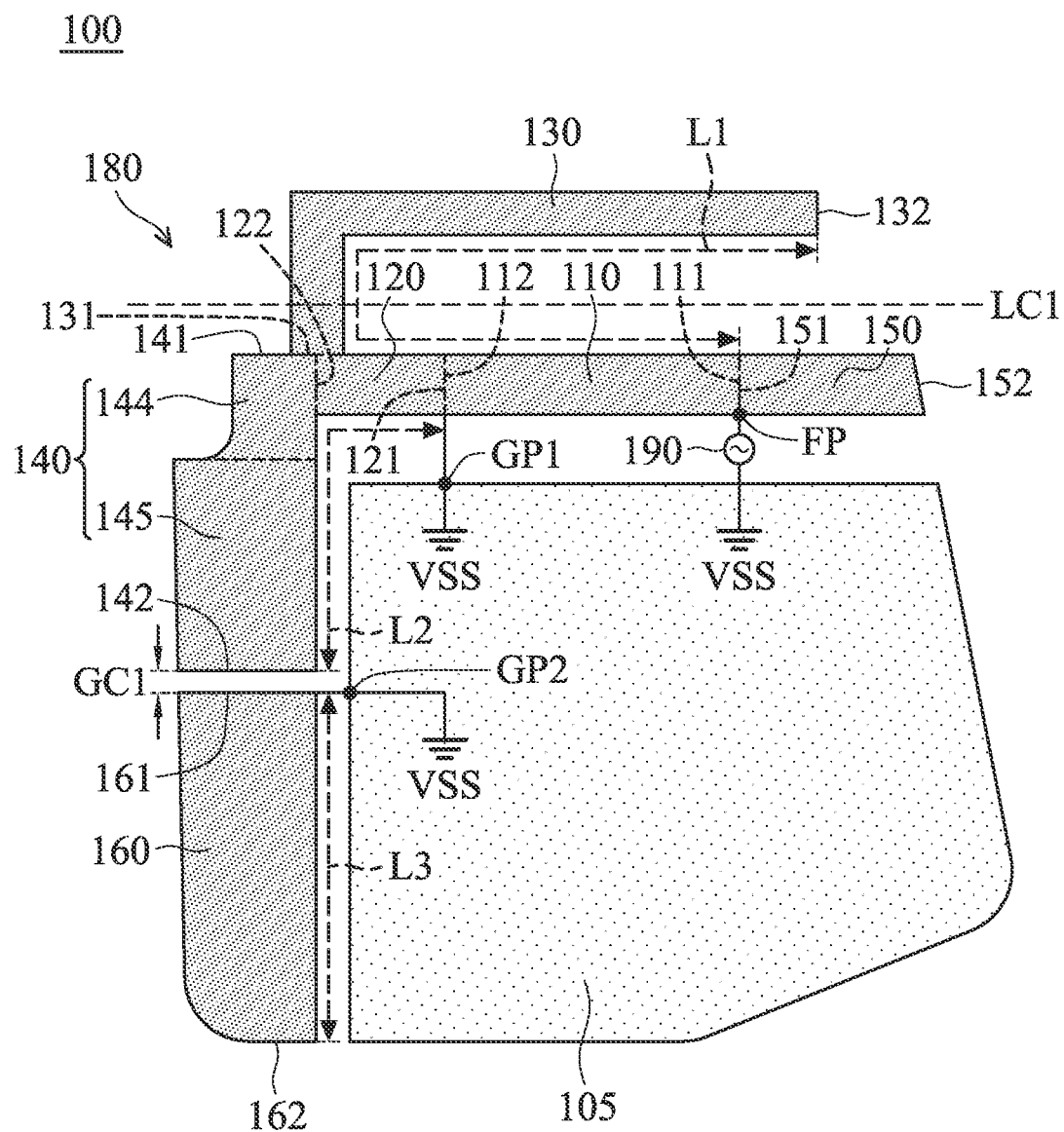
FIG. 1 is a diagram of a wearable device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a wearable device 100 according to an embodiment of the invention. For example, the wearable device 100 may be an HMD (Head Mounted Display), smart glasses, or a smart watch, but it is not limited thereto. In some embodiments, the wearable device 100 may be applied in the fields of VR (Virtual Reality), MR (Mixed Reality), or AR (Augmented Reality).

As shown in FIG. 1, the wearable device 100 at least includes a ground element 105, a first radiation element 110, a second radiation element 120, a third radiation element 130, a fourth radiation element 140, a fifth radiation element 150, and a sixth radiation element 160. The ground element 105, the first radiation element 110, the second radiation element 120, the third radiation element 130, the fourth radiation element 140, the fifth radiation element 150, and the sixth radiation element 160 may all be made of metal materials, such as copper, silver, aluminum, iron, or their alloys. It should be understood that the wearable device 100 may further include other components, such as a processor, a display device, a supply module, and/or a housing, although they are not displayed in FIG. 1.

The ground element 105 may be implemented with a ground copper foil, which may be coupled to a system ground plane (not shown). The ground element 105 can provide a ground voltage VSS.

The first radiation element 110 may substantially have a straight-line shape. Specifically, the first radiation element 110 has a first end 111 and a second end 112. A feeding point FP is positioned at the first end 111 of the first radiation element 110. The second end 112 of the first radiation element 110 is coupled to a first grounding point GP1 on the ground element 105. The feeding point FP may be further coupled to a signal source 190. For example, the signal source 190 may be an RF (Radio Frequency) module.

The second radiation element 120 may substantially have another straight-line shape. Specifically, the second radiation element 120 has a first end 121 and a second end 122. The first end 121 of the second radiation element 120 is coupled to the first grounding point GP1 and the second end 112 of the first radiation element 110.

The third radiation element 130 may substantially have an L-shape, which may be at least partially parallel to the first radiation element 110 and the second radiation element 120. The third radiation element 130 is coupled through the second radiation element 120 to the first radiation element 110. Specifically, the third radiation element 130 has a first end 131 and a second end 132. The first end 131 of the third radiation element 130 is coupled to the second end 122 of the second radiation element 120. The second end 132 of the third radiation element 130 is an open end. In some embodiments, the combination of the first radiation element 110, the second radiation element 120, and the third radiation element 130 substantially has a U-shape.

The combination of the fourth radiation element 140 and the second radiation element 120 may substantially have another L-shape. The fourth radiation element 140 is coupled through the second radiation element 120 to the first radiation element 110. Specifically, the fourth radiation element 140 has a first end 141 and a second end 142. The first end 141 of the fourth radiation element 140 is coupled to the second end 122 of the second radiation element 120 and the first end 131 of the third radiation element 130. The second end 142 of the fourth radiation element 140 is an open end. In some embodiments, the fourth radiation element includes a narrow portion 144 adjacent to the first end 141 and a wide portion 145 adjacent to the second end 142, and the wide portion 145 is coupled through the narrow portion 144 to the second radiation element 120. It should be noted that the term "adjacent" or "close" over the disclosure means that the distance (spacing) between two corresponding elements is smaller than a predetermined distance (e.g., 5 mm or the shorter), or means that the two corresponding elements directly touch each other (i.e., the aforementioned distance/spacing between them is reduced to 0).

The fifth radiation element 150 may substantially have a relatively narrow straight-line shape. Specifically, the fifth radiation element 150 has a first end 151 and a second end 152. The first end 151 of the fifth radiation element 150 is coupled to the feeding point FP and the first end 111 of the first radiation element 110. The second end 152 of the fifth radiation element 150 is an open end. For example, the second end 152 of the fifth radiation element 150 and the second end 132 of the third radiation element 130 may substantially extend in the same direction.

The sixth radiation element 160 may substantially have a relatively wide straight-line shape (compared with the fifth radiation element 150), and it may be adjacent to the fourth radiation element 140. Specifically, the sixth radiation element 160 has a first end 161 and a second end 162. The first end 161 of the sixth radiation element 160 is coupled to a second grounding point GP2 on the ground element 105. The second end 162 of the sixth radiation element 160 is an open end. The second grounding point GP2 may be different from the first grounding point GP1. For example, the second end 162 of the sixth radiation element 160 and the second end 142 of the fourth radiation element 140 may substantially extend in the same direction. In some embodiments, a coupling gap GC1 is formed between the first end 161 of the sixth radiation element 160 and the second end 142 of the fourth radiation element 140.

In a preferred embodiment, an antenna structure 180 of the wearable device 100 is formed by the first radiation element 110, the second radiation element 120, the third radiation element 130, the fourth radiation element 140, the fifth radiation element 150, and the sixth radiation element 160. For example, the antenna structure 180 may be a planar antenna structure, and it may be disposed on a dielectric substrate (not shown), such as an FR4 (Flame Retardant 4) substrate, a PCB (Printed Circuit Board), or an FPC (Flexible Printed Circuit). However, the invention is not limited thereto. In alternative embodiments, adjustments are made such that the antenna structure 180 is a 3D (Three Dimensional) antenna structure (e.g., which may be adjusted along a bending line LC1), without affecting its operational performance.

Figure 2:
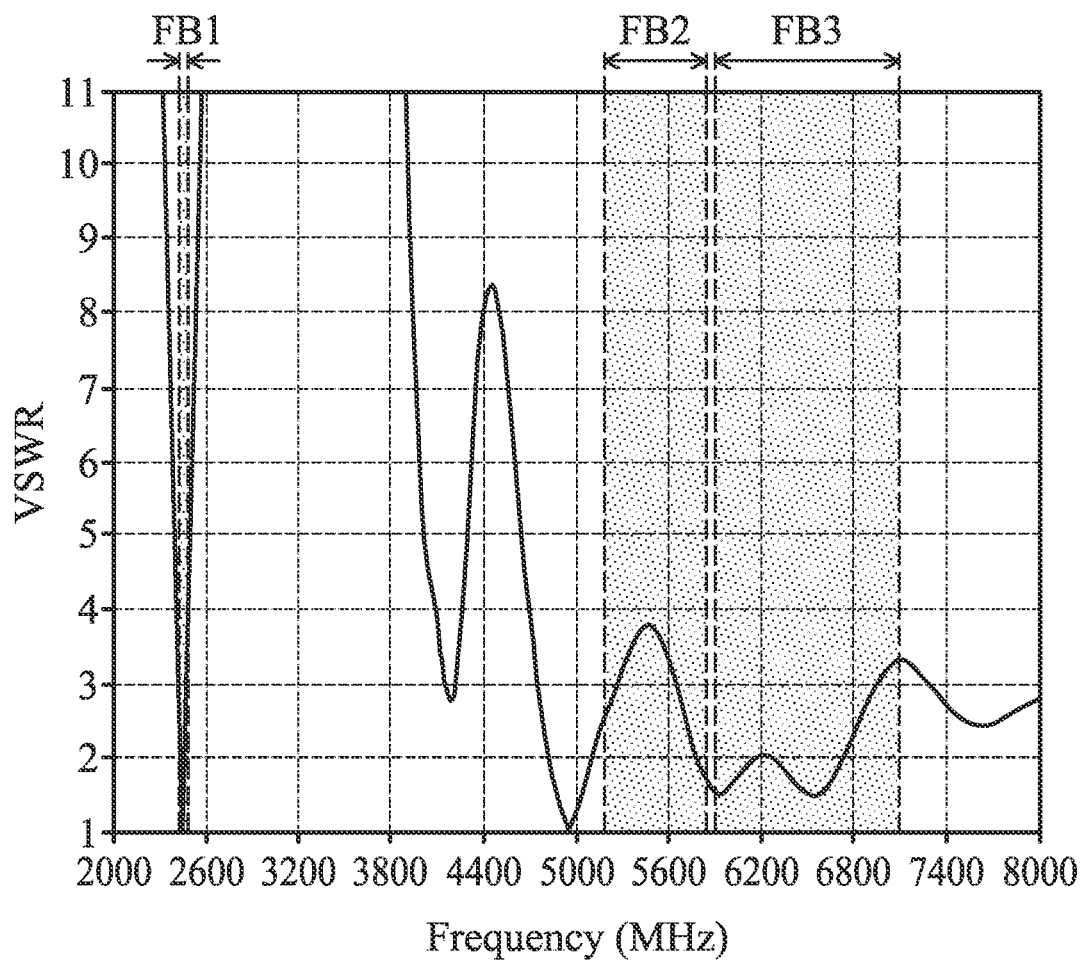
FIG. 2 is a diagram of VSWR (Voltage Standing Wave Ratio) of an antenna structure of a wearable device according to an embodiment of the invention.

FIG. 2 is a diagram of VSWR (Voltage Standing Wave Ratio) of the antenna structure 180 of the wearable device 100 according to an embodiment of the invention. The horizontal axis represents the operational frequency (MHz), and the vertical axis represents the VSWR. According to the measurement of FIG. 2, the antenna structure 180 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure 180 of the wearable device 100 can support at least the wideband operations of conventional WLAN (Wireless Local Area Network) and next-generation Wi-Fi 6E.

In some embodiments, the operational principles of the antenna structure 180 of the wearable device 100 are described as follows. The first radiation element 110, the second radiation element 120, and the third radiation element 130 can be excited to generate the first frequency band FB1. The second radiation element 120 and the fourth radiation element 140 can be excited to generate the second frequency band FB2. The sixth radiation element 160 can be excited by the fourth radiation element 140 using a coupling mechanism, so as to generate the third frequency band FB3. Furthermore, the fifth radiation element 150 and the first grounding point GP1 are configured to fine-tune the impedance matching of the first frequency band FB1, the second frequency band FB2, and the third frequency band FB3.

In some embodiments, the element sizes of the wearable device 100 are described as follows. The total length L1 of the first radiation element 110, the second radiation element 120, and the third radiation element 130 may be substantially equal to 0.25 wavelength (V4) of the first frequency band FB1 of the antenna structure 180. The total length L2 of the second radiation element 120 and the fourth radiation element 140 may be substantially equal to 0.25 wavelength (V4) of the second frequency band FB2 of the antenna structure 180. The length L3 of the sixth radiation element 160 may be substantially equal to 0.25 wavelength (V4) of the third frequency band FB3 of the antenna structure 180. The width of the coupling gap GC1 may be shorter than or equal to 1 mm. The above ranges of element sizes and parameters are calculated and obtained according to many experiment results, and they help to optimize the operational bandwidth and impedance matching of the antenna structure 180 of the wearable device 100.

Figure 3:
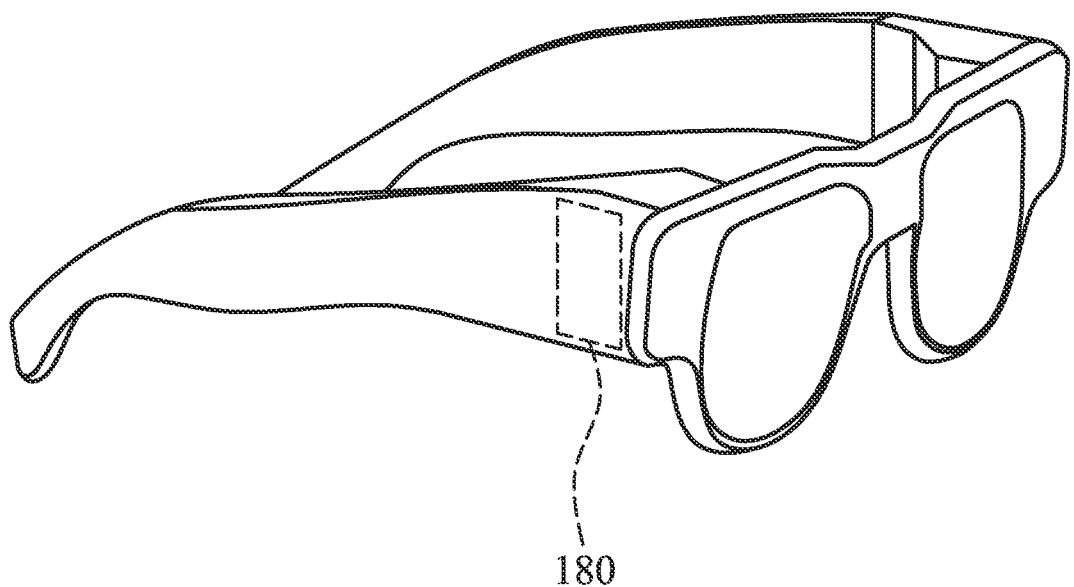
FIG. 3 is a perspective view of an HMD (Head Mounted Display) according to an embodiment of the invention.

FIG. 3 is a perspective view of an HMD 300 according to an embodiment of the invention. In the embodiment of FIG. 3, the HMD 300 is implemented with smart glasses, and the aforementioned antenna structure 180 is positioned at one side of the smart glasses. In addition, a metal frame of the smart glasses can be used as a system ground plane. Other features of the HMD 300 of FIG. 3 are similar to those of the wearable device 100 of FIG. 1. Accordingly, the two embodiments can achieve similar levels of performance.

The invention proposes a novel wearable device and a novel antenna structure therein. In comparison to the conventional design, the invention has at least the advantages of small size, wide bandwidth, and low manufacturing cost. Therefore, the invention is suitable for application in a variety of fields of VR, MR and AR.

Note that the above element sizes, element shapes, and frequency ranges are not limitations of the invention. An antenna designer can fine-tune these settings or values according to different requirements. It should be understood that the wearable device of the invention is not limited to the configurations of FIGS. 1-3. The invention may merely include any one or more features of any one or more embodiments of FIGS. 1-3. In other words, not all of the features displayed in the figures should be implemented in the wearable device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:
   a ground element;
   a first radiation element, having a feeding point, wherein the first radiation element is coupled to a first grounding point on the ground element;
   a second radiation element;
   a third radiation element, coupled through the second radiation element to the first radiation element;
   a fourth radiation element, coupled through the second radiation element to the first radiation element;
   a fifth radiation element, coupled to the first radiation element; and
   a sixth radiation element, coupled to a second grounding point on the ground element, wherein the sixth radiation element is adjacent to the fourth radiation element;
   wherein an antenna structure is formed by the first radiation element, the second radiation element, the third radiation element, the fourth radiation element, the fifth radiation element, and the sixth radiation element;
   wherein a combination of the first radiation element, the second radiation element, and the fifth radiation element substantially has an equal-width straight-line shape;
   wherein the fourth radiation element comprises a narrow portion and a wide portion, and the wide portion is coupled through the narrow portion to the second radiation element;
   wherein the narrow portion of the fourth radiation element has a concave curved edge.

2. The wearable device as claimed in claim 1, wherein a combination of the first radiation element, the second radiation element, and the third radiation element substantially has a U-shape.

3. The wearable device as claimed in claim 1, wherein a combination of the second radiation element and the fourth radiation element substantially has an L-shape.

4. The wearable device as claimed in claim 1, wherein the fifth radiation element substantially has a relatively narrow straight-line shape, and the sixth radiation element substantially has a relatively wide straight-line shape.

5. The wearable device as claimed in claim 1, wherein a coupling gap is formed between the sixth radiation element and the fourth radiation element, and a width of the coupling gap is shorter than or equal to 1 mm.

6. The wearable device as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

7. The wearable device as claimed in claim 6, wherein a total length of the first radiation element, the second radiation element, and the third radiation element is substantially equal to 0.25 wavelength of the first frequency band.

8. The wearable device as claimed in claim 6, wherein a total length of the second radiation element and the fourth radiation element is substantially equal to 0.25 wavelength of the second frequency band.

9. The wearable device as claimed in claim 6, wherein a length of the sixth radiation element is substantially equal to 0.25 wavelength of the third frequency band.

\* \* \* \* \*